United States Patent Office 2,912,549
Patented Nov. 10, 1959

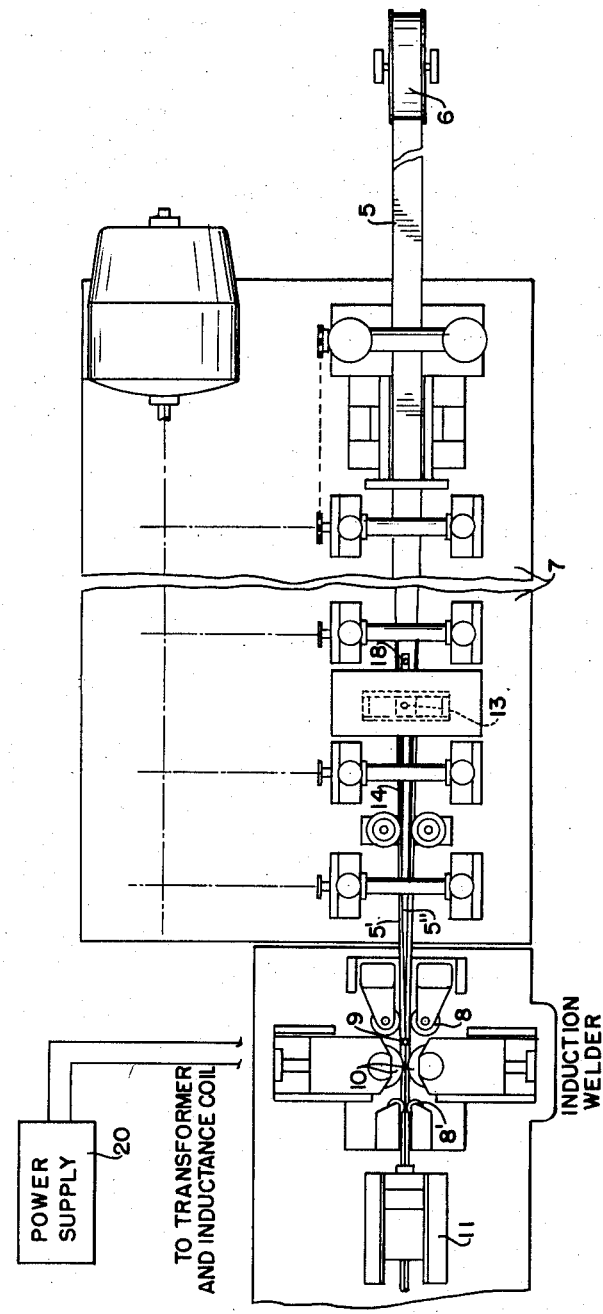

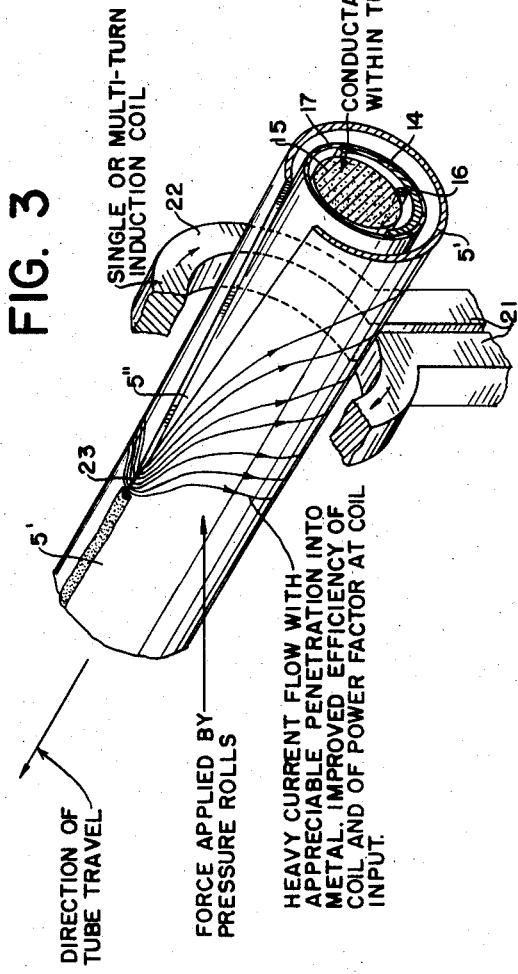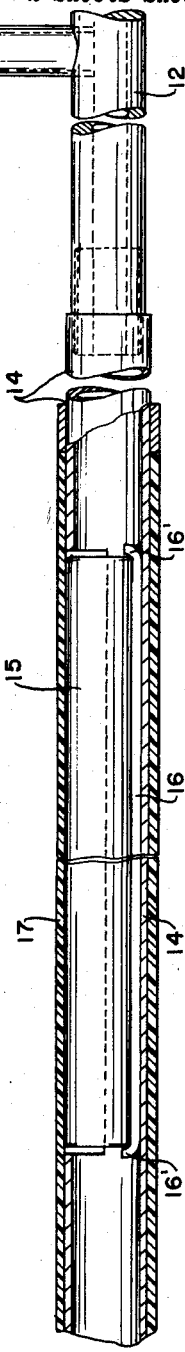

2,912,549

INDUCTION WELDING OF TUBES

Thomas P. Dunn, Rome, N.Y., assignor to Revere Copper and Brass, Inc., New York, N.Y., a corporation of Maryland Application December 17, 1957, Serial No. 703,365

2 Claims. (Cl. 219—8.5)

This invention relates to the electric induction welding of tubes, and has for its object the provision of certain improvements in the induction welding of tubular shapes of any weldable metal. More particularly, the invention aims to improve the performance of apparatus for the induction welding of tubing by increasing the efficiency of the induction coil and the power factor at the coil input. As a consequence of such increased efficiency, more heat is developed at the welding zone in the tube and satisfactory welding is attained at higher speeds than heretofore possible by the heretofore conventional methods of induction welding.

Machines for welding tubes by the electric induction method and by the electric resistance method are well known in the art, and are generally adapted to weld into tubular shape a strip of any weldable metal, such as steel, copper, aluminum etc. Commonly, the strip is initially formed into a tubular, open-seam shape, and the resulting tubular shape is progressively passed through a welding zone where the edges of the seam are electrically heated to welding temperature and the heated edges are forced together by pressure rolls to effect the weld.

In the induction welding method, an induction coil, positioned around the tube, induces an electric current in the tube. The action is essentially that of a transformer with the single- or multi-turn induction coil functioning as the primary and the tube as the secondary. Although it is well known in the transformer art that a magnetic core increases the completeness with which the magnetic field or flux established by the primary surrounds the secondary, magnetic cores have not heretofore been used in commercial induction welding machines. Indeed, in the design of commercial induction welding machines, care has been taken to avoid the presence of magnetic material within the tube in the vicinity of the induction coil, and to this end scarfing tool supports and pipes for cooling medium have been made of non-magnetic material. On the other hand, magnetic cores have been provided in electric resistance welding machines for increasing the impedance to the flow of high frequency current circumferentially around the tube, and thereby concentrating the resistance heating effect of the current in the approaching seam edges and the welding point. Since in induction welding the effective heating current flows circumferentially around the tube, as a consequence of the transformer action, it has probably been supposed that the presence of a magnetic core, or other magnetic material, would (as in resistance welding) have the effect of impeding circumferential flow of current in the tube. However, I have discovered that a permeable magnetic core positioned within a tubular shape to be welded by an induced current actually promotes the flow of circumferential current, and that the theory of the action in induction welding of such a core heretofore held by those skilled in the art is erroneous. The error, I believe, has been occasioned by the failure to realize that in induction welding the magnetic field set up by the induction coil is opposed by the magnetic field set up by the current induced in the tube, with the net result of cancelling the inductive reactances in each component and the lowering of the impedance (i.e. an increase in the conductance) of the entire coil-tube-core combination.

Based on the foregoing discovery, the present invention involves the provision of a permeable magnetic member within a tubular shape to be welded by an electric current induced in the shape by a surrounding induction coil proximate the zone of welding. Conveniently, the magnetic member may be mounted in the scarfing tool assembly which is commonly anchored in the forming mill where the metal strip is formed into the open-seam tubular shape. The formed shape is progressively advanced through a seam spreader into the welding zone of an induction welding machine where the edges of the seam are promptly heated to welding temperature by the induced electric current of increased strength and deeper penetration into the metal resulting from the presence of the magnetic member within the tubular shape. The heated edges of the seam are forged together by pressure to effect a weld. The induction coil is positioned slightly in advance of the application of the forging pressure, and the heavy induced current flows along the approaching edges of the seam to the point where the seam is closed by the forging pressure and then circumferentially around the tube.

The invention will be better understood from the following description taken in conjunction with the accompanying drawings, in which Fig. 1 is a top plan, partially diagrammatic, of an apparatus embodying the improvement of the invention and adapted for practicing the method of the invention, Fig. 2 is a detail view of one form of conductance core assembly, and Fig. 3 is a diagrammatic perspective view of the essential components proximate the welding zone.

Since in the practice of the invention, the effect of the magnetic member is to increase the conductance (by reducing the impedance) of the combination of induction coil, tubular shape and magnetic member, the latter has come to be known as a conductance core. It is made of magnetic material of high permeability and with low inherent hysteresis and eddy current losses. Advantageously, it may be made of a mixture of a magnetic ferrite and a ceramic material, compressed into the desired shape, and sintered. Alternatively, the conductance core may be made of laminations of appropriate magnetic material, such as high silicon transformer steel core, suitably insulated, as for example by dipping in a silicone varnish, riveted or clamped together and oven dried. The core is conveniently of generally cylindrical form, several inches in length, and suitably mounted within the tubular shape undergoing welding.

Referring now to Fig. 1 of the drawing, the strip of weldable metal 5 to be formed into a suitable open-seam tubular shape 5' for welding is fed from a payoff reel 6 into a multi-stand forming mill 7 of conventional design. As viewed in this figure, the longitudinal open-seam 5" is at the top of the tubular shape, and the shape is progressively advanced into a welder having entry and exit guide rolls 8 and 8', respectively, and a seam guide or spreader 9 to keep the seam open until its edges, heated to welding temperature, have been advanced to the pressure rolls 10. The welded tube is progressively advanced through the outside scarfing tool 11, and thence through the quenching unit, sizing unit and cut-off unit onto a run-out table all of conventional design and hence not shown in Fig. 1.

The conductance core is conveniently mounted in the inside scarfing tool assembly as shown in Fig. 2. At its forward end the assembly has a mandrel 12 for anchoring the assembly between the 5th and 6th stands of the 7-stand forming mill 7, as diagrammatically indicated at 13 in Fig. 1. A long non-magnetic tube or conduit 14 of non-ferrous metal or other suitable non-magnetic material is secured to and extends forwardly from the anchor mandrel 12 to the inside scarfing tool (not shown, but appropriately supported within the welded tube near the position of the outside scarfing tool 11). In the vicinity of the welding zone, the upper half of the tube 14 is cut away for a length slightly longer than the conductance core 15. The core is inserted through this cut-away section and rests on a rod or cradle 16 welded or otherwise suitably secured to the bottom of the tube 14 and having upturned ends 16' for holding the core in position. The tube 14 is surrounded by a tight-fitting sleeve 17 of insulating and heat-resistant material covering the cut-away section housing the conductance core and extending a short distance beyond each end of the core. The sleeve may be made of a ceramic material, such as aluminum oxide, or any other material which will not conduct electric current and which will withstand a certain amount of heat from the welding arc. At its forward end, the tube 14 is connected to an upstanding coolant inlet tube 18 whose bore communicates with the bore of the tube 14 to form a coolant conduit to the inside scarfing tool. The inlet tube 18 extends upwardly through the advancing open seam of the tubular shape between the last stands of the forming mill, and is connected to a suitable source of coolant (e.g. soluble oil and water) which flows through the tube 14 and around the conductance core 15 to the inside scarfing tool. The cross sectional area of the conductance core 15 is smaller than that of the conduit 14 to permit the flow of coolant around the core. The coolant serves two purposes. In flowing around the conductance core, it first serves to cool the core, and in passing on to the inside scarfing plug it next serves to cool the inside scarfing tool. There is always a certain amount of eddy current and hysteresis loss in the magnetic material of the conductance core, and the heat developed within the core in consequence thereof is removed to the necessary extent by the coolant.

The power supply 20 (e.g. high frequency generator within the range of 400 to 500 kilocycles) and electrical equipment (e.g. stepdown transformer etc.) for the induction coil are of conventional design and only diagrammatically indicated in Fig. 1 of the drawing. The arrangement of the three essential components of the welding unit are diagrammatically shown in Fig. 3. The leads 21 of the single- or multi-turn induction coil 22 are connected to the secondary of the high frequency transformer. The open-seam tubular shape 5' advances within the coil 22 in the direction indicated by the arrow. Flow of primary current in the induction coil 22 induces a secondary current flow circumferentially around the tube 5', the flow of the primary and secondary currents being in opposite directions, as indicated by the arrows in Fig. 3. The conductance core 15 is positioned within the tube 5' and extends longitudinally for a distance of a few inches in the welding zone. In the interest of clarity, the seam guide, pressure rolls etc. are omitted in Fig. 3, but it will be understood that the induction coil 22 is positioned slightly in advance of the pressure rolls 10 (Fig. 1). The direction and the point at which the pressure rolls apply the forging force is indicated by an arrow in Fig. 3.

Referring to Fig. 3, and assuming that the conductance core 15 is removed, as soon as the longitudinal open seam 5'' is closed (i.e. welded) at 23, an electric current will be induced into the tube 5', and by the manner in which it is induced, will flow in the opposite direction to the current in the induction coil 22. Therefore, the field established by this current flow in the tube will oppose the field established by the current flow in the induction coil. The effect of this opposition to, and distortion of, the induction coil field will be to force the current induced in the tube to the outside surface of the tube. This is a well recognized phenomenon and becomes more pronounced as the frequency of the power applied to the induction coil is increased.

The provision within the tube 5' of the conductance core 15, in accordance with the invention, effects a greater linkage of the induction coil field with the tube, reduces the distortion effect on the coil field by the field established by the opposing, induced current in the tube, and also reduces the tendency of the field established by the current induced in the tube to force this current flow to the outside of the tube. The result is to permit a heavier current flow in the tube and greater penetration of the current into the metal of the tube.

Considering solely the induction coil with no tube within the coil, the effect of a magnetic core within the coil is to increase the inductive reactance and therefore the impedance of the current path around the coil, thus reducing the flow of current in this direction. However, when the combination of the coil, a tube within the coil, and a conductance core within the tube is considered, the effect is entirely different. In this case, there is transformer action and the field or flux set up by the current in the coil is opposed by the field set up by the induced current in the tube. The net result is the cancelling of the inductive reactances in both the coil and the tube and the lowering of the impedance, and hence an increase in the conductance of the entire coil-tube-core combination.

The presence of the conductance core within the tube thus improves the effective alternating current conductance of the tube so that current can flow more readily around the tube. The presence of the conductance core permits welding speeds several times in excess of those attainable without the core, with both ferrous and non-ferrous weldable metals. Additionally the presence of the conductance coil improves the power factor of the coil input.

The following examples are typical of the improved performance of a present day conventional induction welding machine equipped with a conductance core in accordance with the invention. The examples are illustrated and in no sense restrictive of the scope of the invention.

The conductance core was made of a mixture of magnetic ferrite and ceramic material, pressed into the form of a cylinder (½ inch in diameter and 8 inches long), and sintered. The core was mounted in the induction welder as described in connection with Fig. 2 of the drawing. The power supply was a 450 kilocycle generator having an oscillator delivering 50 kilowatts at approximately 5,000 volts to the primary of a high frequency transformer whose secondary (stepped down to about 500 volts) was connected to the leads 21 of the induction coil where the current was about 3500 amperes at full load. With this equipment, tubes 1 inch outside diameter of 0.035 inch gauge (wall thickness) low carbon steel were welded at the rate of at least 280 feet per minute. The same equipment, without the conductance core, was able to weld the same type of tube at a maximum rate of only 75 feet per minute. With the same equipment, using the conductance core, deoxidized copper tube (1" O.D. x 0.040" wall) can be welded at the rate of at least 150 f.p.m. Without the conductance core, the maximum speed obtainable in welding the same type of tube is about 40 f.p.m. In both cases, the weld was very uniform along the length of the tube, and the exterior surface was free of the scratches that are characteristic of high frequency resistance welding as a consequence of the sliding type of contact electrodes.

Tubes of ferrous and non-ferrous metals ranging from ⅝ inch to 3½ inch O.D., with wall thicknesses ranging from 0.020 to 0.11 inch, have been successfully welded by the practice of the invention. Especially good results have been secured with deoxidized copper and low carbon steel. Zinc-containing alloys, such as bronzes and brasses can be satisfactorily welded by the practice of the invention.

I claim:

1. In an apparatus for welding a longitudinal open seam in a tubular shape of weldable metal having means for progressively advancing the tubular shape through a welding zone where the edge portions of the seam are adapted to be heated by an induced electric current to welding temperature and the heated edges forced together by pressure rolls to effect a weld, the improvement which comprises an induction coil positioned around the tubular shape at the welding zone and adapted to induce in the tubular shape a circumferentially flowing electric current, an inside scarfing tool assembly including a non-magnetic coolant conduit anchored in advance of the welding zone and positioned inside the tubular shape when undergoing welding and adapted to deliver a coolant to the scarfing tool, and a generally cylindrical permeable magnetic member mounted in the coolant conduit in the vicinity of the welding zone and within the influence of the magnetic field established by said induction coil, the cross-sectional areas of the coolant conduit and magnetic member permitting the flow of coolant around the member.

2. The improvement according to claim 1, in which the upper half of the coolant conduit in the vicinity of the welding zone is cut away for a length slightly greater than the length of the magnetic member, and the magnetic member is secured in the cut-away section of the conduit, and the magnetic member and cut-away section of the conduit are covered by a tight-fitting sleeve of insulating and heat-resistant material.

References Cited in the file of this patent

UNITED STATES PATENTS

| | | |
|---|---|---|
| 1,365,198 | Sessions | Jan. 11, 1921 |
| 1,365,199 | Sessions | Jan. 11, 1921 |
| 2,716,689 | Body | Aug. 30, 1955 |

FOREIGN PATENTS

| | | |
|---|---|---|
| 377,655 | Great Britain | Jan. 21, 1931 |